United States Patent [19]

Keizer

[11] 4,162,510

[45] Jul. 24, 1979

[54] KEEL-TIPPED STYLUS FOR VIDEO DISC SYSTEMS

[75] Inventor: Eugene O. Keizer, Princeton, N.J.

[73] Assignee: RCA Corporation, New York, N.Y.

[21] Appl. No.: 781,317

[22] Filed: Mar. 25, 1977

[51] Int. Cl.² .............................................. G11B 3/44
[52] U.S. Cl. ........................... 358/128; 179/100.41 G;
274/38
[58] Field of Search ................. 179/100.3 V, 100.1 B,
179/100.4 R, 100.41 G, 100.41 P, 100.41 R,
100.41 L; 274/38; 358/128

[56] References Cited

U.S. PATENT DOCUMENTS

| | | | |
|---|---|---|---|
| 1,718,035 | 6/1929 | Douglass | 274/38 |
| 1,817,094 | 8/1931 | Moore | 51/124 R |
| 2,572,426 | 10/1951 | Andrews | 179/100.41 R |
| 3,654,401 | 4/1972 | Dickopp | 179/100.41 L |
| 3,917,903 | 11/1975 | Taylor | 358/128 |
| 4,031,546 | 6/1977 | Leedom | 179/100.41 G |

FOREIGN PATENT DOCUMENTS 615836 1/1927 France ....................................... 274/38

Primary Examiner—Bernard Konick
Assistant Examiner—Alan Faber
Attorney, Agent, or Firm—E. M. Whitacre; W. H. Meagher; D. A. Kulkarni

[57] ABSTRACT

A pickup stylus adapted for playing back prerecorded signals from a disc record groove of a given width upon establishment of stylus/record relative motion has a dielectric support element which has a tip. The terminating portion of the tip is shaped to have a prow, a substantially flat rear surface remote from the prow, a pair of substantially parallel side surfaces extending from the side edges of the rear surface, a bottom surface extending from the bottom edge of the rear surface and additional surfaces extending from the prow and intersecting the bottom and the side surfaces. The stylus tip is dimensioned such that the maximum separation between the substantially parallel side surfaces is less than the given width.

10 Claims, 13 Drawing Figures

KEEL-TIPPED STYLUS FOR VIDEO DISC SYSTEMS

The present invention relates to a novel disc record playback system of a form suitable for playback of high density information records such as video discs, and to a novel stylus structure advantageous for use in such playback systems.

BACKGROUND OF THE INVENTION

In U.S. Pat. No. 3,842,194 issued Oct. 15, 1974 Jon K. Clemens, a video playback system of a variable, capacitance form is disclosed. In one configuration of the Clemens system, information, representative of recorded picture and sound, is encoded in a relatively fine spiral groove on the surface of a disc record (e.g., groove width—3.5 micrometers, groove depth—1.0 micrometers). The record substrate is covered with a coating of conductive material and a dielectric layer overlying the conductive coating. During playback, a pickup stylus, having a thin conductive electrode (e.g., about 0.2 micrometers thick), engages the groove as the record is rotated by a supporting turntable. Capacitive variations between the stylus electrode and the conductive coating are sensed to recover the prerecorded information.

In the systems of the above type, the use of a relatively fine record groove and the groove-engaging requirement for the pickup stylus result in a stylus tip which is extremely small.

Typically, the stylus support tip is defined by a prow, a substantially flat, V-shaped rear surface remote from the prow, a bottom surface extending from the bottom edge of the rear surface and a pair of side surfaces extending from the side edges of the rear surface and converging at the prow. The intersection of the rear and the side surfaces with the bottom surface forms, for example, a triangular footprint. Illustratively, the angle included between the two side edges is equal to 42°, the length of the bottom edge is about 2 micrometers, the height of the triangular footprint is about 4 micrometers and the angle between the prow and the rear surface is about 40°.

In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion (FIG. 1); and (2) an "asymmetrical" structure, wherein the stylus electrode comprises a conductive coating on the rear surface of a dielectric support (FIG. 5).

The asymmetrical stylus form has proven to be convenient for ease in stylus fabrication, in that the entire rear surface is coated with conductive material. However, the stylus electrode, being V-shaped, gets wider as the stylus structure wears out. As the stylus electrode gets wider, the spurious capacitance between the electrode and the conductive coating in the adjacent grooves becomes significant, introducing noise in the recovered signal. When the stylus electrode becomes wider than the groove width (e.g., 3.5 micrometers), it is desirable to replace the stylus.

Moreover, as both the stylus structures disclosed in Clemens get wider with the use, the used styli simultaneously cover several grooves during playback, which may introduce stylus mistracking and resultant signal distortion.

SUMMARY OF THE INVENTION

A novel keel-tipped pickup stylus structure for playing back prerecorded signals from a disc record groove of a given width, pursuant to this invention, overcomes the above mentioned problems. The keel-tipped pickup stylus comprises a dielectric support element having a body, a fore-and-aft constricted terminal portion and shoulders interconnecting the body with the constricted terminal portion.

The constricted terminal portion is defined by a prow, a substantially flat rear surface remote from said prow, a plurality of substantially parallel side surfaces extending from the side edges of the rear surface, a bottom surface extending from the bottom edge of the rear surface, and a plurality of additional surfaces extending from the prow and intersecting the bottom and the side surfaces. The maximum separation between the substantially parallel side surfaces is less than the given groove width.

DETAILED DESCRIPTION OF THE PREFERRED EMBODIMENT

Figure 1:
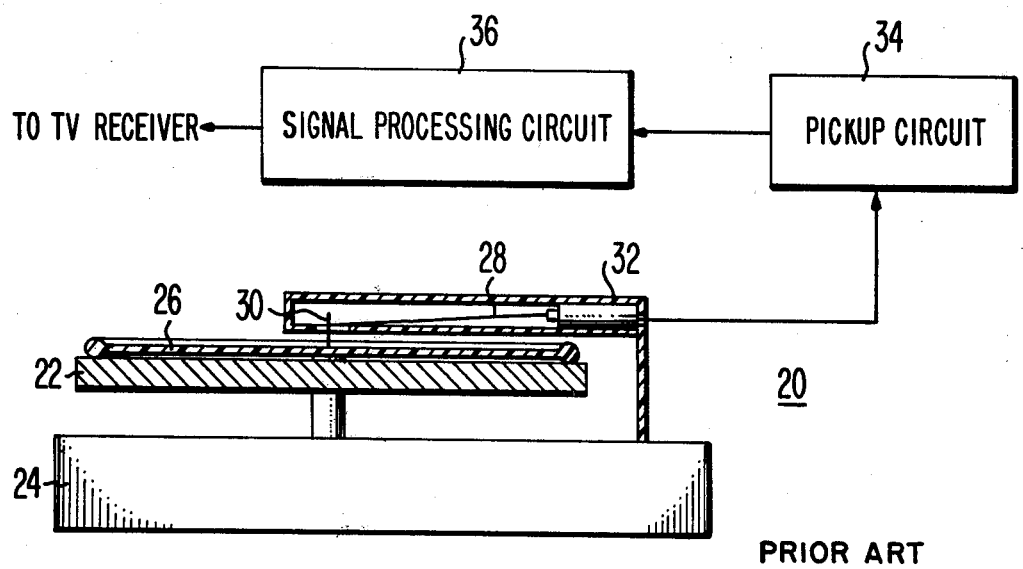
FIG. 1 illustrates a video disc system for playing back prerecorded signals recorded in a disc record groove of a given width in which a keel-tipped pickup stylus constructed in accordance with the present invention may be advantageously employed.

Referring to FIG. 1, there is illustrated therein a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm). The turntable 22 supports and centers a video disc 26 having information, representative of picture and sound, recorded along a spiral groove disposed on the surface thereof. To obtain an adequate playback time, the groove convolutions on the video disc 26 are relatively closely spaced (e.g., groove pitch—3.5 micrometers). As stated previously, the video disc 26 has a dielectric deposit overlying a conductive coating on the video disc substrate.

A stylus arm 28, carrying a groove-engaging pickup stylus 30 at the free end thereof, is pivotally supported at its remote end to a carriage 32. The stylus arm pivot may be of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system may be of the type shown in U.S. Pat. No. 3,870,835 issued to F. R. Stave.

As previously indicated, the pickup stylus 30 incorporates a relatively thin electrode (e.g., 0.2 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit 34 may be of the type illustrated in U.S. patent application Ser. No. 743,144 of H. Kawamoto, et al, and filed on Nov. 18, 1977, and now U.S. Pat. No. 4,080,625. The signal processing circuit 36 may be of the type illustrated in U.S. Pat. No. 3,969,757 issued to J. Amery.

Figure 2:
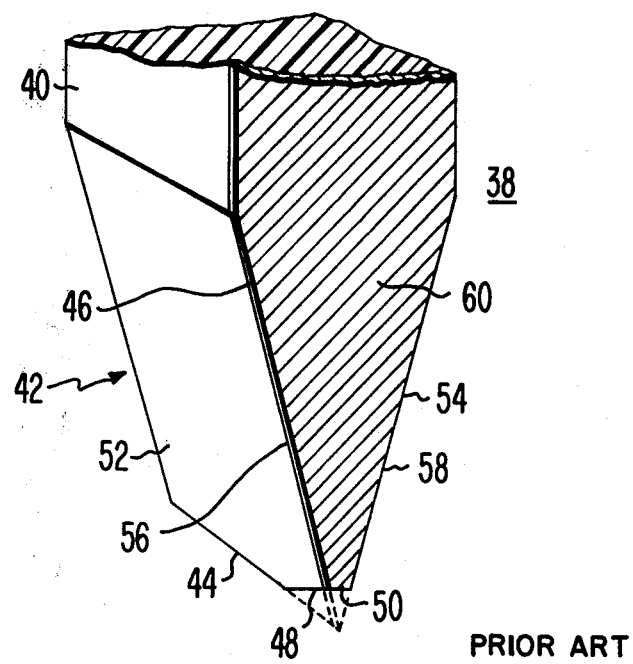
FIG. 2 shows a perspective view of a prior art stylus having a V-shaped tip.

FIG. 2 shows a prior art pickup stylus having a V-shaped tip. The V-tipped pickup stylus 38 includes a dielectric support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectively, from the side edges 56 and 58 of the rear surface and intersecting at the prow. The intersection of the rear surface 46 and the side surfaces 52 and 54 with the bottom surface 48 defines, for example, a triangular stylus footprint. The entire rear surface 46 of the stylus support element 40 is coated with conductive material to form an electrode 60.

Figure 3:
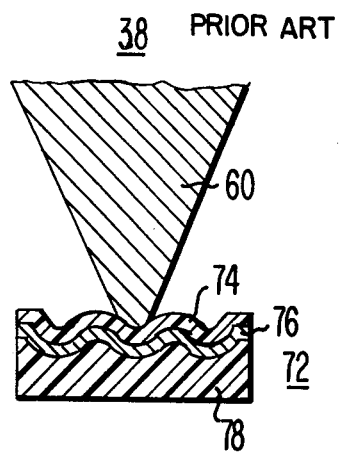
FIGS. 3, 4 and 5 depict successive steps in the life of a V-tipped stylus of FIG. 2, the V-tipped stylus being shown riding in a disc record groove.
Figure 4:
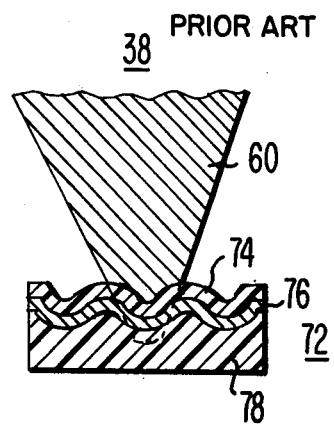
Figure 5:
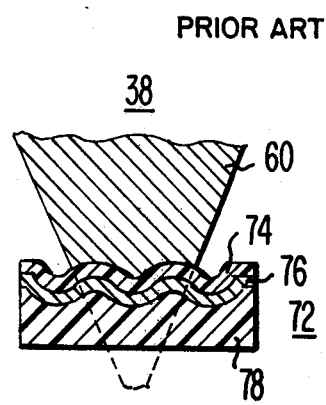

FIGS. 3, 4 and 5 show successive stages in the life of the V-shaped pickup stylus 38 riding in a groove disposed on the surface of a video disc 72 having a dielectric deposit 74 overlying a conductive coating 76 on the video disc substrate 78.

As the pickup stylus 38 wears to a shape shown in FIG. 4, the width of the stylus electrode 60 becomes the same as the distance between the adjacent grooves (eg. 3.5 micrometers). When the stylus electrode 60 becomes wider, the cross-talk in the signal pickup output increases and it becomes desirable to replace the pickup stylus.

However, if the pickup stylus 38 is allowed to wear to a shape shown in FIG. 5, the stylus now covers several grooves and causes stylus mistracking.

Figure 6:
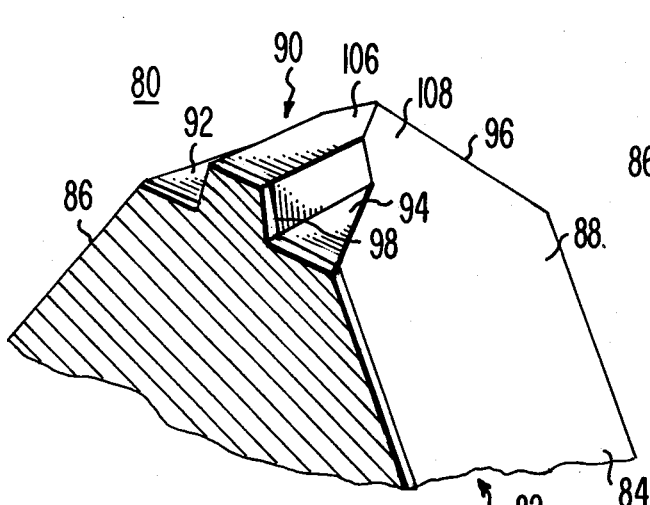
FIGS. 6 and 7 show perspective views of a keel-tipped stylus for use in the system of FIG. 1.
Figure 7:
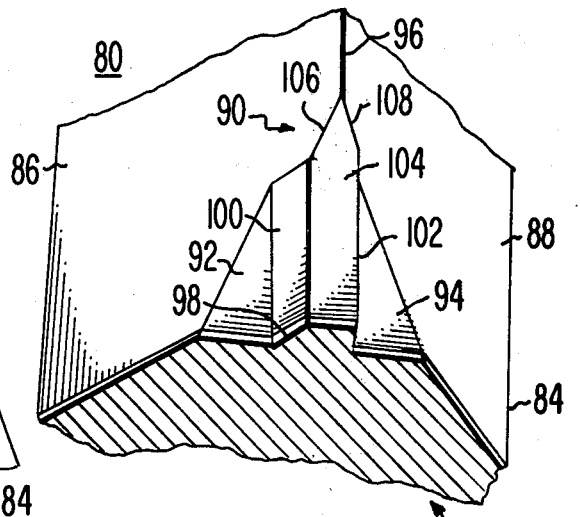
Figure 8:
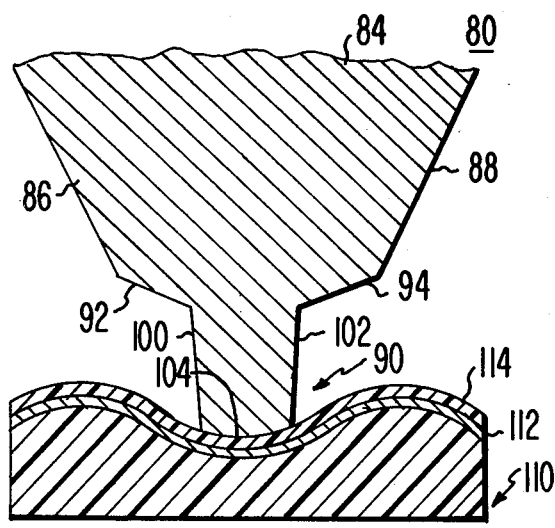
FIGS. 8 and 9 illustrate successive steps in the life of a variation of the keel-tipped stylus of FIGS. 6 and 7; the modified keel-tipped stylus being shown riding in a disc record groove.
Figure 9:
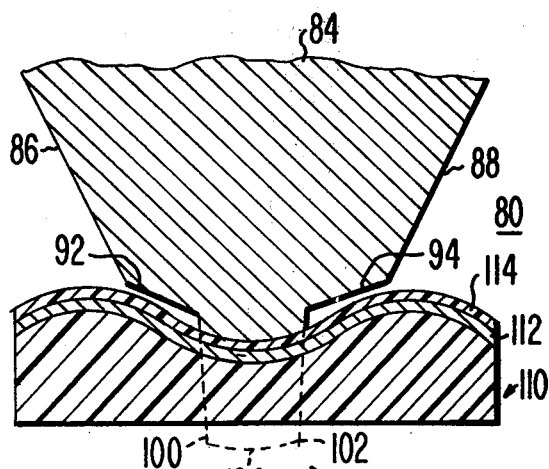
Figure 10:
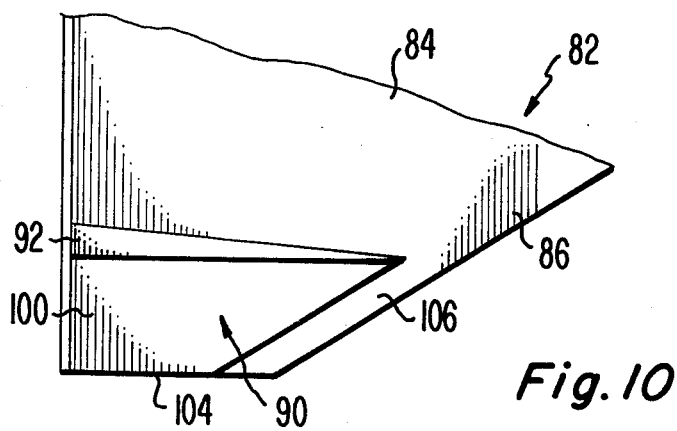
FIGS. 10 and 11 show a side view and a bottom view of the modified keel-tipped stylus of FIGS. 8–9.
Figure 11:
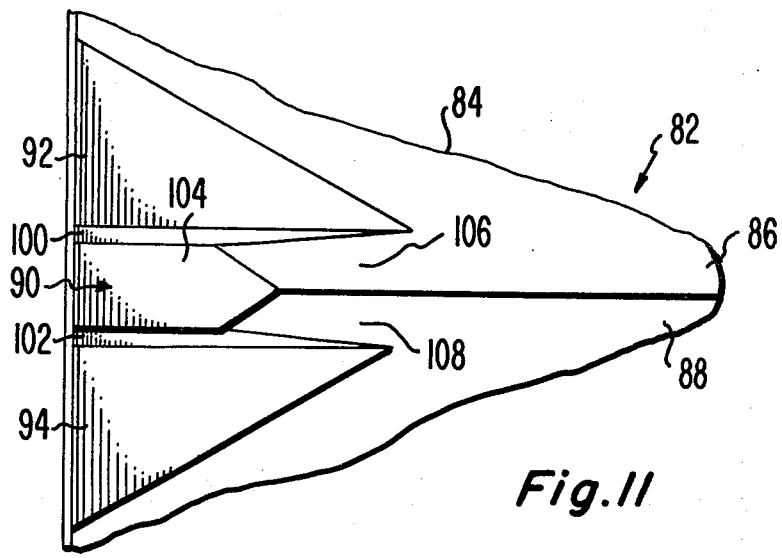

A novel keel-tipped pickup stylus, pursuant to the present invention, overcomes these problems. FIGS. 6 and 7 show the perspective views of a keel-tipped stylus 80. FIGS. 8, 10 and 11 illustrate the front view, the side view and the bottom view of a variation of the keel-tipped stylus 80. FIG. 9 shows a worn keel-tipped stylus 80 of the type shown in FIGS. 8, 10 and 11.

As shown in the respective drawings, the keel-tipped stylus 80 includes a dielectric support element 82. The dielectric support element 82 comprises a body 84 having bevelled surfaces 86 and 88, a fore-and-aft constricted terminal portion 90 and shoulders 92 and 94 joining the bevelled body to the contricted terminal portion.

The consticted terminal portion 90 is defined by a prow 96, a substantially flat rear surface 98 remote from the prow, a pair of substantially parallel side surfaces 100 and 102 extending from the side edges of the rear surface, a bottom surface 104 extending from the bottom edge of the rear surface and a pair of additional surfaces 106 and 108 extending from the prow and intersecting the bottom and the side surfaces. The intersection of the rear, the side and the additional surfaces with the bottom surface defines, illustratively, a pentagonal stylus footprint. The keel-tipped stylus 80 is constructed such that an apex of the pentagonal footprint is located on the prow 96.

In the embodiment of FIGS. 6 and 7, the shoulders 92 and 94 are parallel to the bottom surface 104 of the constricted terminal portion 90. Alternately, as shown in FIGS. 8–11, the shoulders 92 and 94 may be flared relative to the bottom surface 104.

FIGS. 8 and 9 show successive stages in life of a keel-tipped stylus 80, having flared shoulders 92 and 94, riding in a given width groove disposed on the surface of a video disc 110 having a coating of conductive material 112 and a layer of dielectric deposit 114 overlying the conductive coating. It can be seen that the stylus life is extended by an order of magnitude since a greater volume of stylus has to wear away before the stylus becomes unusable. Additionally, the stylus performance is significantly increased because the stylus electrode does not get wider as the stylus wears out and because the edges of the stylus electrode are spaced at a greater distance from the conductive coating in the adjacent grooves of the video disc as compared with a V-shaped stylus electrode.

Illustratively, the configuration of the keel-tipped stylus 80 is as follows: the angle included between the bevelled surfaces 86 and 88—42°, the height of the constricted portion 90—5 micrometers, the distance between the substantially parallel side surfaces of the constricted portion—5 micrometers, the fore-and-aft dimension of the constricted portion—8 micrometers, and the angle included between the prow 96 and the shoe 104—35°.

With this configuration, the life of the keel-tipped stylus is about twice the life of the previously mentioned V-tipped stylus and the increment in the signal-to-noise ratio is of the order of 3 dB (average).

The keel-tipped stylus not only offers advantages in performance and stylus life, but it is relatively easy to fabricate by modifying a V-shaped stylus (e.g., shown in FIG. 2) to obtain a keel-tipped stylus.

Figure 12:
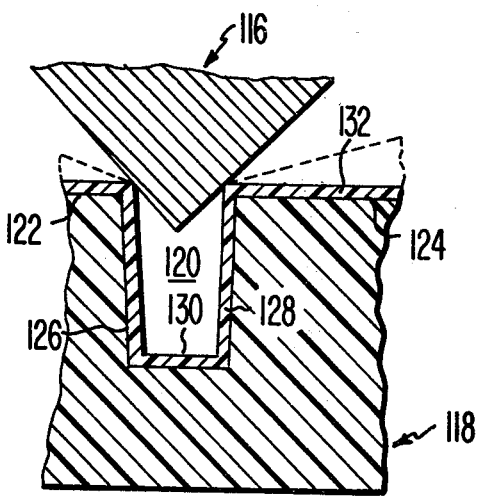
FIGS. 12 and 13 show a portion of a lapping disc suitable for forming the keel-tipped stylus of FIGS. 6 and 7.
Figure 13:
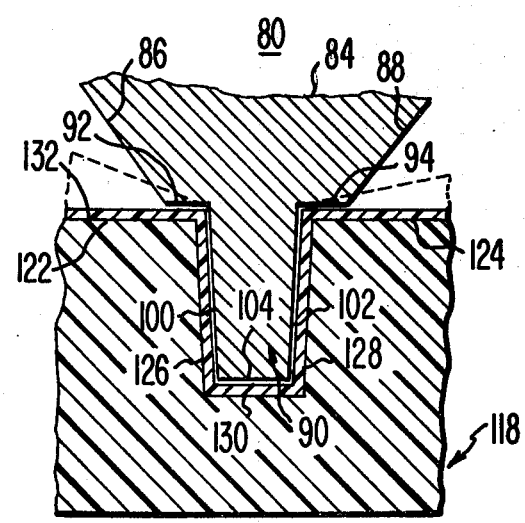

The keel-tipped stylus is formed by running the V-shaped stylus 116 on an abrasive lapping disc 118 with a deep coarse-pitched groove 120 as shown in FIG. 12. The lands 122 and 124 on the lapping disc 118 lap the shoulders 92 and 94 and the walls 126 and 128 of the abrasive groove 120 form the substantially parallel side surfaces 100 and 102 as shown in FIG. 13. The abrasive groove 120 can be deeper than the height of the keel-tip 90 and the stylus footprint can be lapped later. Alternatively, as shown in FIG. 13, the bottom 130 of the abrasive groove 120 can be positioned such that it laps the stylus shoe 104.

The lapping disc 118 shown in FIGS. 12 and 13 provides a keel-tipped stylus of the form shown in FIGS. 6 and 7. By suitably modifying the lapping disc, as shown by the dotted lines in FIGS. 12 and 13, a keel-tipped stylus of the form shown in FIGS. 8–11 can be made.

The manufacture of the lapping disc 118 will now be described. A fairly flat and smooth copper clad substrate is coated with a thick coating (e.g., several micrometers) of photoresist. The photoresist coated substrate is exposed with an intense beam of energy (e.g., electron beam or light) of the desired width (e.g., 3.5 micrometers) along a spiral track of a coarse pitch. After developing the exposed photoresist coated substrate, the exposed photoresist region is removed to form a coarse spiral groove on the substrate. A metal stamper is obtained therefrom by a process such as electroless plating. The metal stamper is used to press plastic discs. The plastic discs may be made from the same material as video discs. An abrasive material, such as $SiO_2$, is deposited thereon to form an abrasive layer 132 as shown in FIGS. 12 and 13.

keel-tipped styli, in accordance with embodiments of the present invention, have been successfully made from diamond, as well as from sapphire, support elements.

Use of the described keel lapping procedure is not limited to factory production; it could be done in the home, a store or repair shop, or as a factory reconditioning operation to restore a worn stylus.

While the invention is described in the context of capacitive pickup styli, the principles are applicable as well to styli for pressure pickups, for example.

What is claimed is:

1. In a playback system including a turntable for rotating a disc record having signals prerecorded in the bottom of a spiral groove of a given width and disposed on the surface of said record; a pickup stylus for playing back said prerecorded signals when stylus/record relative motion is established; said pickup stylus comprising:
    a dielectric support element having a tip which is defined by a prow and a substantially flat rear surface remote from said prow;
    the terminating portion of said rear surface being formed by a bottom edge, a pair of side edges extending substantially orthogonally from the ends of said bottom edge and a pair of laterally extending edges originating from the ends of said side edges remote from said bottom edge; the maximum separation between said side edges being less than said given groove width;
    said tip additionally including a bottom surface extending from said bottom edge and terminating at said prow, a pair of substantially parallel side surfaces extending from said side edges, a pair of laterally extending surfaces originating from said laterally extending edges, and surfaces extending from the ends of said parallel side surfaces remote from said rear surface and converging at said prow;
    wherein said stylus is arranged in said groove for playback such that, at the point of reception of said stylus, (a) said bottom edge is disposed transverse to said groove and in contact with said groove bottom, (b) said parallel side surfaces are disposed in the direction of said groove, and (c) the movement of said record extends from said prow toward said bottom edge;
    wherein said stylus is dimensioned such that said laterally extending surfaces are spaced from said record surface upon stylus reception in said groove; and
    said stylus further having a layer of conductive material adherent to said rear surface.

2. A pickup stylus as defined in claim 1 wherein the intersection of said rear surface, said parallel side surfaces and said converging surfaces with said bottom surface defines a stylus footprint; wherein said stylus footprint is a pentagon having an apex located on said prow.

3. In a playback system including a turntable for rotating a disc record having signals prerecorded in the bottom of a spiral groove of a given width and disposed on the surface of said record; a pickup stylus for playing back said prerecorded signals when stylus/record relative motion is established; said pickup stylus comprising:
    a dielectric support element having a body, a fore-and-aft constricted terminal portion having a reduced width, and a pair of laterally extending surfaces interconnecting said body with said constricted terminal portion;
    said constricted terminal portion being defined by a prow, a substantially flat rear surface remote from said prow, said substantially flat rear surface having a base edge and a pair of side edges extending substantially orthogonally from the ends of said base edge, a pair of substantially parallel side surfaces extending from said side edges of said rear surface, a bottom surface extending from said bottom edge of said rear surface and terminating at said prow, and surfaces extending from the ends of said parallel side surfaces remote from said rear surface and converging at said prow; the intersection of said rear, said side and said converging surfaces with said bottom surface defining a stylus footprint;
    the maximum separation between said substantially parallel side surfaces being less than said given groove width;
    wherein said stylus is arranged in said groove for playback such that, at the point of reception of said stylus, (a) said base edge is disposed transverse to said groove and in contact with said groove bottom, (b) said parallel side surfaces are disposed in the direction of said groove, and (c) the movement of said record extends from said prow toward said base edge;
    wherein said stylus is dimensioned such that said laterally extending surfaces are spaced from said record surface upon stylus reception in said groove; and
    said stylus further having a layer of conductive material adherent to said rear surface.

4. A pickup stylus as defined in claim 3 wherein said stylus footprint is a pentagon with an apex located on said prow.

5. A pickup stylus as defined in claim 3 wherein each of said laterally extending surfaces is disposed substantially parallel to said bottom surface.

6. A pickup stylus as defined in claim 3 wherein said laterally extending surfaces are flared relative to said bottom surface.

7. A pickup stylus as defined in claim 3 wherein said body is defined by an extension of said rear surface, said laterally extending surfaces and extensions of said converging surfaces.

8. In a playback system including a turntable for rotating a disc record having signals prerecorded in the bottom of a spiral groove of a given width and disposed on the surface of said record; a pickup stylus for playing back said prerecorded signals when stylus/record relative motion is established; and apparatus comprising the combination of:
    (A) a stylus arm having a longitudinal axis;
    (B) a pickup stylus including:

a dielectric support element including a body which has a fore-and-aft constricted terminal portion having a reduced width, said body further including a pair of laterally extending surfaces connecting said constricted terminal portion to remainder of said body, said fore-and-aft constricted terminal portion being defined by a prow, a substantially flat rear surface remote from said prow, said substantially flat rear surface having a base edge and a pair of side edges extending substantially orthogonally from the ends of said base edge, a pair of substantially parallel side surfaces extending from said side edges of said rear surface, a bottom surface extending from said bottom edge of said rear surface and terminating at said prow, and surfaces extending from the ends of said parallel side surfaces remote from said rear surface and converging at said prow;

the intersection of said rear, said side and said converging surfaces with said bottom surface defining a stylus footprint;

the maximum separation between said substantially parallel side surfaces being less than said given groove width;

(C) means for securing said pickup stylus to said stylus arm such that, when said stylus is received in said groove for playback, (a) said base edge is disposed transverse to said groove and resting on said groove bottom, (b) said parallel side surfaces are disposed in the direction of said groove, and (c) the movement of said record extends from said prow toward said base edge;

wherein said stylus is dimensioned such that said laterally extending surfaces are spaced from said record surface upon stylus reception in said groove; and (D) a layer of conductive material adherent to said rear surface.

9. An apparatus as defined in claim 8, wherein said securing of said pickup stylus to said stylus arm is such that said substantially parallel side surfaces are disposed parallel to the longitudinal axis of said stylus arm, and said prow is disposed in a plane substantially parallel to said parallel side surfaces.

10. An apparatus as defined in claim 8 wherein said stylus footprint is a pentagon with an apex disposed on said prow.

* * * * *